Sept. 3, 1963 J. L. BENNETT ETAL 3,102,964
HIGH-EFFICIENCY PERMANENT MAGNET MOTOR
Filed April 13, 1961 2 Sheets-Sheet 1
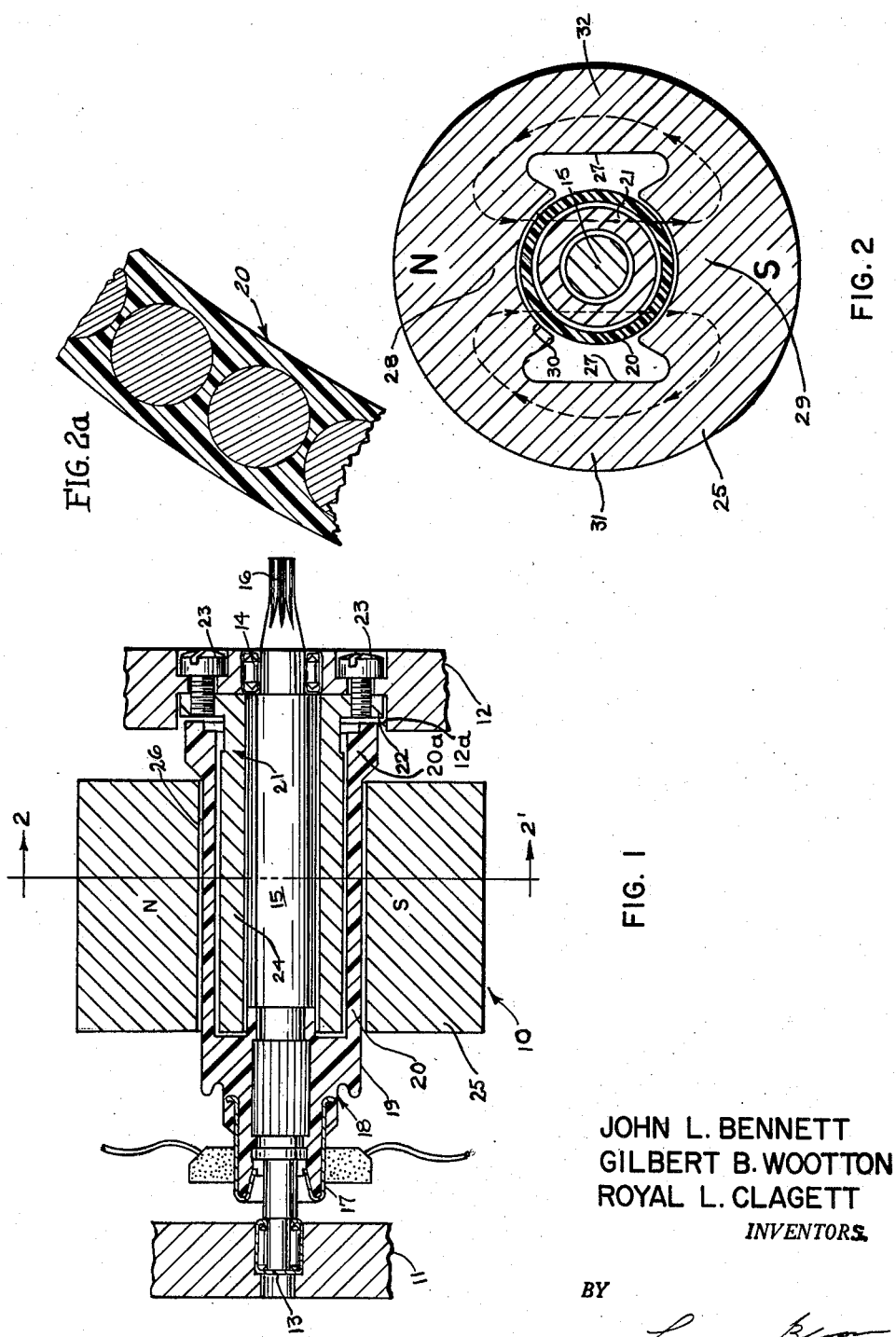
JOHN L. BENNETT
GILBERT B. WOOTTON
ROYAL L. CLAGETT
*INVENTORS.*
BY
ATTORNEY Sept. 3, 1963   J. L. BENNETT ETAL   3,102,964
HIGH-EFFICIENCY PERMANENT MAGNET MOTOR
Filed April 13, 1961   2 Sheets-Sheet 2

JOHN L. BENNETT
GILBERT B. WOOTTON
ROYAL L. CLAGETT
INVENTORS
BY *Leonard Bloom*
ATTORNEY 3,102,964
Patented Sept. 3, 1963

3,102,964
HIGH-EFFICIENCY PERMANENT MAGNET MOTOR
John L. Bennett and Gilbert B. Wootton, Baltimore, and Royal L. Clagett, Hampstead, Md., assignors to The Black and Decker Manufacturing Company, Towson, Md., a corporation of Maryland
Filed Apr. 13, 1961, Ser. No. 102,705
1 Claim. (Cl. 310—154)

The present invention relates to a high-efficiency direct current electric motor, and more particularly, to such a motor that combines high-efficiency with relatively high-output.

It is an object of the present invention to provide a high-efficiency high-output direct current motor which includes an encapsulated iron-free armature having low mass, low inductance, and low windage.

It is another object of the present invention to provide a high-efficiency high-output direct current motor having a stationary permanent magnet concentric with the armature and disposed outwardly with respect to the armature.

It is still another object of the present invention to provide a direct current motor having low frictional losses throughout.

It is yet still another object of the present invention to provide a high-efficiency direct current motor having a stationary ferrous core within a hollow cylindrical iron-free encapsulated armature.

These and other objects of the present invention will become apparent from a reading of the following specification, taken in conjunction with the enclosed drawings, in which:

FIGURE 1 is a longitudinal sectional view of the completed motor as mounted in a suitable frame;

FIGURE 2 is a sectional view taken along the lines 2—2 of FIGURE 1;

FIGURE 2a is an enlarged portion of FIGURE 2 showing the individual wires of the wound armature encapsulated within the plastic body or matrix.

Figure 3:
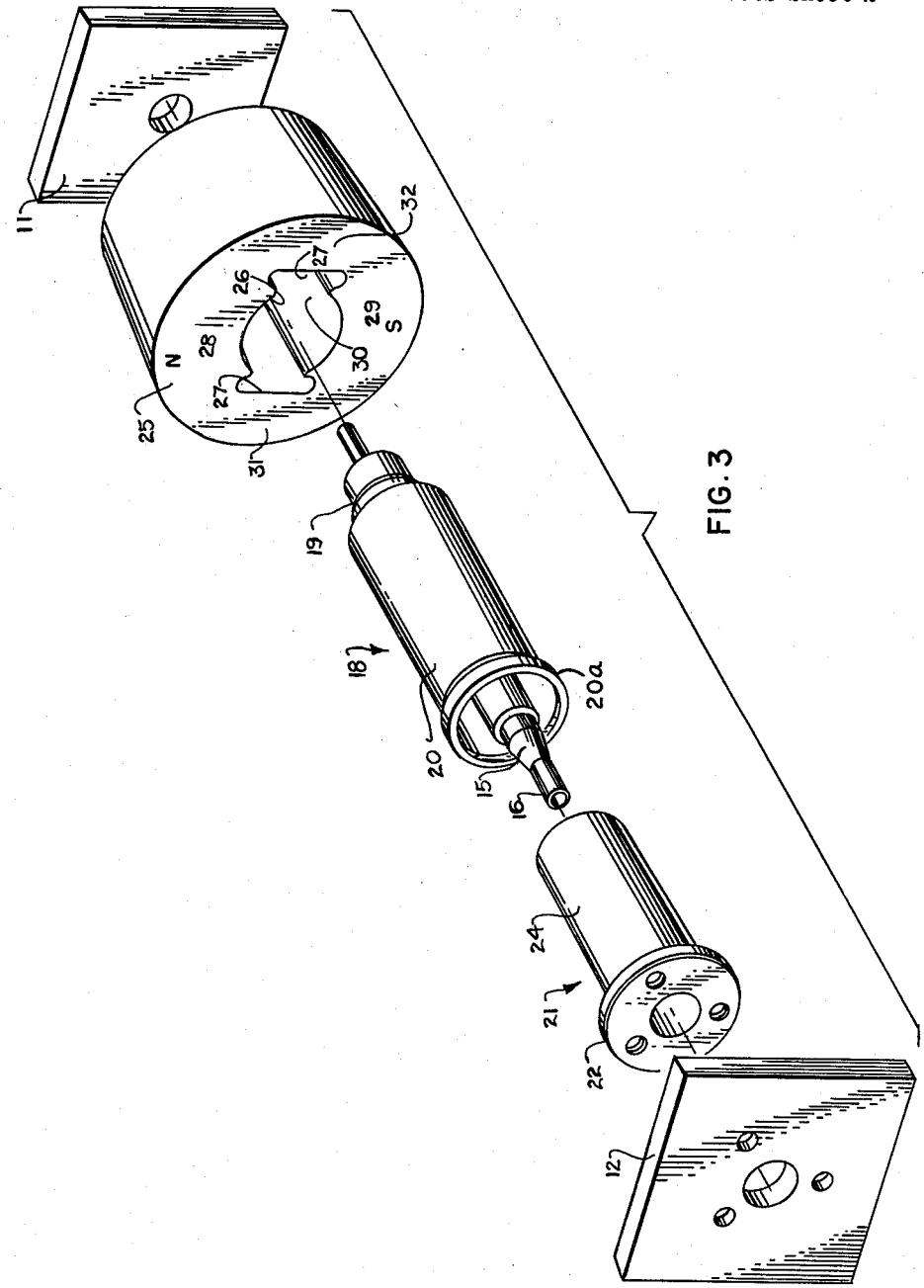
FIGURE 3 is an exploded perspective, showing the main components of the motor as viewed from a direction opposite to that of FIGURE 1.

In accordance with a specific embodiment of the present invention, a high-efficiency high-output direct motor is provided having a frame which includes a pair of parallel side walls for purposes of mounting the main components of the motor. Coaxially-aligned bearings are provided, one in each of the walls; and an armature shaft is journaled in the bearings. A commutator structure is secured to the shaft also near one of the walls, and the shaft carries an iron-free armature winding encapsulating and supporting structure secured to the shaft adjacent to the commutator, preferably with both the armature winding encapsulating structure and the commutator structure integrally molded to each other and to the shaft by a continuous insulating plastic body or matrix. The armature includes a hollow cylindrical portion concentric with the shaft and projecting axially away from the commutator in which the windings are supported and encapsulated. A stationary tubular ferrous core is secured to the other of the walls, and the core projects axially towards the commutator and is disposed within the hollow cylindrical portion of the armature. Both the core and the armature are concentric with respect to each other, there being a slight radial air gap therebetween. The armature shaft is in turn disposed concentrically within the tubular core, there being radial running or operating clearance therebetween. An outer concentric stationary permanent magnet is provided, which has a pair of diametrically-opposite salient poles. The hollow cylindrical portion of the armature is disposed between the poles of the magnet, being concentric with respect to the magnet; and the poles and the hollow cylindrical portion of the armature have a slight radial air gap therebetween. Thus, the core serves to concentrate the magnetic flux passing through the hollow cylindrical portion of the armature and between the poles of the permanent magnet; and the remaining portions of the magnet, between the poles, provide circumferential return paths for the magnetic flux.

With reference to the drawings, the motor 10 is mounted in a frame which includes substantially parallel end walls 11 and 12. Wall 11 may be deemed to be the "fore" wall, while the wall 12 may be deemed to be the "aft" wall. Respective bearings 13 and 14 are retained within the walls 11 and 12; and preferably, but not necessarily, the bearings 13 and 14 are of the needle type. A longitudinal shaft 15 of the armature (designated by the general reference numeral 18) is journaled for rotation in the bearings 13 and 14. The forward portion of the shaft 15 projects beyond wall 11, and conveniently a pinion 16 is formed directly on the projecting portion of the shaft 15. Shaft 15 carries a commutator 17 located near to the wall 11, and an encapsulated iron-free armature 18 (having windings embedded in a plastic matrix) is carried by the shaft 15 and has a closed portion 19 joined to the shaft 15 adjacent to commutator 17. The armature 18 further includes a main hollow cylindrical portion 20 radially disposed with respect to the shaft 15 and projecting axially away from the commutator 17 and towards the wall 11, and the hollow cylindrical portion 20 terminates in an integrally-molded collar portion 20a.

It will be appreciated from an examination of FIGURES 1 and 3, that the armature 18 including portions 19 and 20 thereof, together with the commutator 17, shaft 15 and pinion 16, may be conveniently formed as a single encapsulated subassembly, and that this overall subassembly constitutes the only rotating component of the motor 10; moreover, the method of winding the coils of armature 18, together with the process of assembly and the molding technique, are more particularly described in the co-pending Marshall application Serial No. 106,398 filed April 28, 1961 and assigned to the same assignee as the present invention.

Further, it will be appreciated that the hollow cylindrical portion 20 and the commutator 17 are integrally molded or cast both with respect to each other and to the shaft 15, and further that the motor 10 (with the possible exception of the shaft 15) contains no iron or other ferrous materials in its rotating parts. Furthermore, should it be desired, the armature shaft 15 may be made of a non-ferrous material.

A stationary tubular core 21 is provided with a collar portion 22 seated within a pilot counterbore 12a formed in the wall 12; and the collar 22 is in turn secured to the side wall 12 by suitable means, such as a plurality of screws, one of which is indicated at 23. The core 21 is disposed coaxially within and has a slight radial air gap with respect to the hollow cylindrical portion 20 of the armature 18. Moreover, core 21 has a main tubular portion 24 which has a radial running clearance with respect to the armature shaft 15, and at least the portion 24 of core 21 is made of a relatively-soft ferrous material. The motor 10 is further provided with an outer concentric cylindrical permanent magnet 25, which may be made of "Alnico" or other well-known materials shown more particularly in perspective view in FIGURE 3. The magnet 25 is stationary and is retained both axially and radially, for example, in a manner described more particularly in the co-pending Butler et al. application Serial No. 102,819, filed April 13, 1961 and assigned to the same assignee as the present invention. This later referenced application is entitled "High-Efficiency Cordless Electric Drill" and pertains to one type of electrical device that the motor 10 of the present invention finds a special utility.

As shown more particularly in FIGURES 2 and 3, the permanent magnet 25 is provided with a longitudinal bore 26 and is further provided with a pair of diametrically-opposite substantially prismatic parallel slots, one of which is indicated at 27. As shown in the drawings, the slots 27 communicate partially with the bore 26, defining a pair of diametrically-opposite salient poles 28 and 29, intermediate the slots 27; and it will be appreciated that each of the poles 28 and 29 has an arcuate face (shown as at 30 in FIGURE 3) coterminous with the bore 26.

It will also be appreciated that such a permanent magnet 25 usually has a slidable keeper plug maintained within the bore 26 to insure that there will be no loss of magnetic flux between the poles 28 and 29 in storage or transfer of the magnet; and that in the assembly of the motor 10, and more particularly the permanent magnet 25 thereof, within a tool or device utilizing the motor 10, it is convenient (and wise) to use what may be deemed to be a "transfer" plug. Such a transfer plug, as well as a keeper plug, are described in the aforementioned co-pending Butler et al. application Serial No. 102,819.

As shown more particularly in FIGURE 2, the hollow cylindrical portion 20 of the armature 18 is concentrically arranged between the poles 28 and 29, there being a slight radial air gap therebetween. Thus the magnetic flux, as shown by the dotted lines in FIGURE 2, will pass between the poles 28 and 29 of the magnet 25 and through the hollow cylindrical portion 20 of the armature 18. These flux lines will be concentrated by means of the stationary tubular core 21, while the portions 31 and 32 of the magnet 25 will provide a circumferential return path for the magnetic flux.

Preferably, but not necessarily, the magnet 25 has an integral one-piece construction and is manufactured by means known to one skilled in the art. Also, it will be appreciated from an examination of FIGURE 1, that the magnet 25 is substantially coterminous axially with respect to the hollow cylindrical portion 20 of the armature 18. Thus the magnet 25 is axially positioned substantially intermediate of the integrally molded collar portion 20a of the armature 18 and the closed portion 19 of the armature 18, that is, at the location of the longitudinal portions of the windings, and that the integrally molded collar portion 20a has an axial running clearance both with respect to the stationary magnet 25 and to the collar 22 of the stationary core 21. Moreover, the core 21 has a sufficient axial running clearance with respect to the closed end portion 19 of the armature 18. Also, as shown more particularly in FIGURE 1, some of the molding material may extend from the closed portion 19 of the armature 18 axially or longitudinally around the armature shaft 15, but this is for reasons of process or method of assembly; and it is described more particularly in the aforementioned co-pending Marshall application Serial No. 106,398. In FIGURE 1, the holders for the commutator-engaging brushes have been omitted for ease of illustration; but the brushes are conventional, and for electrical considerations, may be made of silver-graphite or copper, if desired.

In summary, then, it will be appreciated that the teachings of the present invention provide a direct current permanent magnet motor having high efficiency conjoined with relatively high-output. The motor accomplishes these purposes in the following manner; one, by reducing frictional losses throughout to an absolute minimum; two, by eliminating any magnetic material in the rotating armature winding, thus considerably reducing the usual core losses that would otherwise be present; three, by providing a stationary permanent magnet that is external to the armature, thus allowing a relatively large permanent magnet to be used, and thus maintaining a high air gap flux density for maximum power output; four, by providing a stationary tubular ferrous core internally of the armature, the armature rotating between the external magnet and the internal core for maximum efficiency; five, by making the armature proportionally small in diameter in relation to the permanent magnet; six, by providing an armature which has low inductance, low inertia, and a minimum windage; seven, by providing a low inertia rotating armature having consequently very low-mass, thus presenting low radial loads to the bearings, and thus resulting in minimum frictional losses in the bearings; and eight, by utilizing an iron-free armature winding structure that is supported and encapsulated by a body of insulating material integral with the commutator segment support and cast directly on the armature shaft.

We claim:

A high-efficiency relatively high-output electric motor, comprising:

(a) a housing comprising a pair of substantially-parallel walls having respective bores formed therein and bearings in each of said bores;

(b) a rotating armature comprising a shaft journaled in said bearings and a hollow cylindrical iron-free encapsulated portion integrally-cast to said shaft at one end of said armature, with said armature having an open radially-enlarged opposite end;

(c) a commutator integrally-cast on the said one end of the armature;

(d) respective windings in said armature, electrically connected to said commutator, and electrical brushes engaging said commutator;

(e) said one wall having an internal face having a pilot counterbore formed therein;

(f) a stationary ferrous core comprising a tubular member open at both ends and having an outwardly-flanged collar seated within said counterbore and secured therein to said one wall;

(g) an outer stationary permanent magnet concentrically arranged with respect to said hollow cylindrical portion of said armature and substantially-coterminous, axially, with respect to said hollow-cylindrical portion;

(h) said magnet, armature, and core having respective radial running clearances therebetween;

(i) said radially-enlarged portion of said armature being disposed between said magnet and said collar of said stationary core with respective axial running clearances therebetween; and (j) said stationary core having an open end, opposite from its collar, confronting said integrally-cast portion of said armature with an axial running clearance therebetween.

References Cited in the file of this patent

UNITED STATES PATENTS

| | | |
|---|---|---|
| 2,835,834 | Steingger | May 20, 1958 |
| 2,860,267 | Hayes | Nov. 11, 1958 |
| 2,978,598 | Kato | Apr. 4, 1961 |